United States Patent
Chen et al.

(10) Patent No.: US 12,166,685 B2
(45) Date of Patent: Dec. 10, 2024

(54) METHOD FOR IMPLEMENTING COLLECTIVE COMMUNICATION, COMPUTER DEVICE, AND COMMUNICATION SYSTEM

(71) Applicant: HUAWEI TECHNOLOGIES CO., LTD., Shenzhen (CN)

(72) Inventors: Qiang Chen, Hangzhou (CN); Sicong Li, Hangzhou (CN); Xiaogang Pan, Hangzhou (CN); Yidu Chen, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/324,742

(22) Filed: May 26, 2023

(65) Prior Publication Data

US 2023/0300080 A1    Sep. 21, 2023

Related U.S. Application Data

(63) Continuation of application No. PCT/CN2021/103616, filed on Jun. 30, 2021.

(30) Foreign Application Priority Data

Nov. 26, 2020 (CN) .......................... 202011345108.6
Dec. 29, 2020 (CN) .......................... 202011600044.X

(51) Int. Cl.
*H04L 12/00* (2006.01)
*H04L 47/62* (2022.01)
*H04L 67/10* (2022.01)

(52) U.S. Cl.
CPC .............. *H04L 47/62* (2013.01); *H04L 67/10* (2013.01)

(58) Field of Classification Search
CPC ........ G06F 9/546; G06F 9/3838; G06F 13/37; G06F 9/5011; H04L 49/90; H04L 47/62; H04L 67/10; H04L 12/40032; G06Q 10/10
(Continued)

(56) References Cited

U.S. PATENT DOCUMENTS 7,086,062 B1 *   8/2006   Faour ..................... G06Q 10/10
                                                              718/100
2008/0168471 A1 * 7/2008   Benner .................. H04L 49/90
                                                              719/314
(Continued)

FOREIGN PATENT DOCUMENTS

WO        2020186836 A1    9/2020

*Primary Examiner* — Frantz Coby
(74) *Attorney, Agent, or Firm* — Leydig, Voit & Mayer, Ltd.

(57) ABSTRACT

A method for implementing collective communication, a computer device, and a communication system are provided, to resolve problems of high communication latency and resource consumption in the conventional technology. The method includes: identifying a work request having no communication dependency, and when forwarding work requests, directly forwarding the work request identified as having no communication dependency, and forwarding, after queue management, a work request that is not identified as having no communication dependency. According to the application, communication latency caused when the work request having no communication dependency is managed by using a queue can be avoided, and resource consumption caused by performing related management can be reduced, to improve overall communication performance of collective communication.

18 Claims, 8 Drawing Sheets

(58) Field of Classification Search
USPC .......................................................... 709/217
See application file for complete search history.

(56) References Cited

U.S. PATENT DOCUMENTS

| | | | |
|---|---|---|---|
| 2011/0119673 A1* | 5/2011 | Bloch | G06F 9/546 |
| | | | 710/104 |
| 2016/0065659 A1 | 3/2016 | Bloch et al. | |
| 2018/0089122 A1* | 3/2018 | Oz | G06F 13/37 |
| 2019/0294442 A1* | 9/2019 | Fang | G06F 9/3838 |

* cited by examiner

METHOD FOR IMPLEMENTING COLLECTIVE COMMUNICATION, COMPUTER DEVICE, AND COMMUNICATION SYSTEM

CROSS-REFERENCE TO RELATED APPLICATIONS

This application is a continuation of International Application No. PCT/CN2021/103616, filed on Jun. 30, 2021, which claims priority to Chinese Patent Application No. 202011600044.X, filed on Dec. 29, 2020, and Chinese Patent Application No. 202011345108.6, filed on Nov. 26, 2020, all of which are hereby incorporated by reference in their entireties.

TECHNICAL FIELD

Embodiments of this application relate to the field of information technologies, and in particular, to a method for implementing collective communication, a computer device, and a communication system.

BACKGROUND

In collective communication, processing of collective operations usually requires participation of a plurality of processes. Each process may receive data from several other different processes and need to perform corresponding processing, and send processed data to the other processes.

For communication between processes running on different computer devices, data transmission between different processes needs to be implemented by using network adapters on the different computer devices. Due to network impact, data packets transmitted between the processes disorderly arrive at a receive end computer device, and time of arrival is uncertain. An interrupt is triggered when a process running on the receive end computer device receives data. When an operating system of the receive end computer device is processing a computing task by using all cores, due to reception of data transmitted between the processes, the operating system stops a computing task being processed by using a part of the cores, and turns to processing the interrupt. However, time for the interrupt and context switching causes time consumption that occurs when the operating system of the receive end computer device processes the task, affecting performance of the receive end computer device.

To resolve a problem of overall performance deterioration caused by the interrupt, one manner is to control data transmission between the processes by using a queue when the network adapter sends the data. However, this manner has problems of high latency and resource consumption of the collective communication.

SUMMARY

Embodiments of this application provide a method for implementing collective communication, a computer device, and a communication system, to resolve problems of high communication latency and resource consumption in the conventional technology.

According to a first aspect, an embodiment of this application provides a computer device, including a processor, a memory, and a host channel adapter, where the memory stores a computer executable program;

the processor is configured to execute the computer executable program, to implement the following operations:

converting an operation request of collective communication into a work request, and identifying a work request having no communication dependency; and sending the work request to the host channel adapter; and the host channel adapter is configured to: determine whether the received work request is a work request having no communication dependency; and directly forward a work request identified as having no communication dependency, and forward, after queue management, a work request that is not identified as having no communication dependency.

The computer device directly forwards the work request having no communication dependency by identifying the work request having no communication dependency. This avoids communication latency caused when the work request having no communication dependency is managed by using a queue, and can reduce resource consumption caused by performing related management, to improve overall communication performance of the collective communication.

Optionally, the operation request of collective communication is a cross-node operation request. Different nodes communicate with each other via a network. The node includes but is not limited to a device having a computer function, for example, a computer device having a computing function or a computer device having a storage function.

Optionally, the cross-node operation request of collective communication may be an operation request that needs to be quickly forwarded between a plurality of nodes and/or needs to be accurately synchronized between the plurality of nodes.

Optionally, the operation request of collective communication is an intra-node operation request, to be specific, collective operations implemented between different processes or different threads in a same node.

Optionally, before converting the operation request of collective communication into the work request, the processor is further configured to perform grid division based on a quantity of communication submodules of the collective communication and a task that needs to be executed by each communication submodule. Through the grid division, a task for implementing the operation request of collective communication is allocated to a resource in an idle mode for running, so that resource utilization can be improved.

Optionally, that the processor sends the work request to the host channel adapter includes:

the processor converts the work request into a format that can be recognized by the host channel adapter, and sends the work request to the host channel adapter through an interface between the processor and the host channel adapter.

Optionally, the identifying a work request having no communication dependency includes:

adding a first identifier to a work request having no communication dependency, where the first identifier is used to indicate that the work request is a work request having no communication dependency; and/or adding a second identifier to a work request having communication dependency, where the second identifier is used to indicate that the work request is a work request having communication dependency.

When the first identifier is added to the work request having no communication dependency, the host channel adapter determines whether the received work request includes the first identifier. When the received work request includes the first identifier, the host channel adapter determines that the work request is a work request having no communication dependency. When the received work request does not include the first identifier or includes the second identifier, the host channel adapter determines that the work request is a work request having communication dependency.

When the second identifier is added to the work request having communication dependency, the host channel adapter determines whether the received work request includes the second identifier. When the received work request includes the second identifier, the host channel adapter determines that the work request is a work request having communication dependency. When the received work request does not include the second identifier, the host channel adapter determines that the work request is a work request having no communication dependency.

In some possible implementations, the collective communication is any one of the following communication: communication between one first communication submodule and a plurality of second communication submodules, communication between a plurality of first communication submodules and one second communication submodule, and communication between the plurality of first communication submodules and the plurality of second communication submodules.

In some possible implementations, the work request is a request of communication between one of the first communication submodules and one of the second communication submodules.

In some possible implementations, the having no communication dependency means that communication between one of the first communication submodules and one of the second communication submodules does not need to depend on another communication submodule.

In some possible implementations, the processor is further configured to execute the computer executable program, to implement the following operation:

identifying, based on a mode of communication between different communication submodules in the work request, whether the work request is a work request having no communication dependency.

In some possible implementations, the communication mode includes a mode of data transmission between two communication submodules in a work request, and whether the data transmission between the two communication submodules depends on data sent by the another communication submodule.

Optionally, the mode of data transmission between the two communication submodules in the work request is a mode of data transmission between a communication submodule serving as a data sender and a communication submodule serving as a data receiver in the work request. Correspondingly, whether the data transmission between the two communication submodules depends on data sent by another communication submodule includes: whether sending of data by the communication submodule serving as the data sender to the communication submodule serving as the data receiver depends on the data sent by the another communication submodule.

In some possible implementations, the communication mode is determined based on an interface for communication between the different communication submodules.

In some possible implementations, the first communication submodule is run by using the computer device, the second communication submodule is run by using another computer device, and the computer device communicates with the another computer device via a network; and the host channel adapter is further configured to: directly forward, via the network, the work request identified as having no communication dependency, and forward, via the network and after the queue management, the work request that is not identified as having no communication dependency.

Optionally, the network is an InfiniBand-based network.

In some possible implementations, that the host channel adapter forwards, after the queue management, the work request that is not identified as having no communication dependency includes:

loading, by the host channel adapter, the work request that is not identified as having no communication dependency into a queue, and determining whether a condition that is recorded in the queue and that triggers the work request that is not identified as having no communication dependency is met; and when the condition is met, sending the work request that is not identified as having no communication dependency.

Optionally, the condition includes whether data sent to a communication submodule receiving data in the work request has been received. When the data sent to the communication submodule receiving data in the work request has been received, a condition for triggering a work request that does not carry the first identifier is met.

Alternatively, the condition includes whether another work request triggering the work request is already in the queue. This condition is met when the another work request triggering the work request is already in the queue. When the another work request triggering the work request is not in the queue, the condition is not met, and the processor does not trigger the work request until the condition is met.

In some possible implementations, the work request includes a plurality of work requests; and the plurality of work requests include one or more work requests identified as having no communication dependency, and one or more work requests that are not identified as having no communication dependency.

In some possible implementations, the processor is further configured to execute the computer executable program, to implement the following operations:

receiving the operation request of collective communication initiated by an application program running on the computer device; and obtaining a quantity of communication submodules for the collective communication, a task that needs to be executed by each communication submodule, data transmitted between the different communication submodules, and information about a transmission mode.

Optionally, the application program may be a high performance computing (HPC) industry application, an HPC-artificial intelligence (I) industry application, or a big data industry application.

Optionally, the application program may initiate the operation request of collective communication by using a command for initiating collective operations.

In some possible implementations, that the processor converts an operation request of collective communication into a work request includes:

converting the operation request of collective communication into the work request, and executing a control command of the work request, where the control command is used to control the work request to implement collective operations.

In some possible implementations, the collective communication is collective communication based on a message passing interface (MPI).

Optionally, the processor converts the operation request of collective communication into the work request based on an MPI library stored in the memory and information obtained from the operation request of collective communication. In an implementation, the processor selects, from the MPI library, an MPI collective communication interface used for communication between the communication submodules, and determines, based on the selected MPI collective communication interface, a mode of communication between different communication submodules in the work request. Different MPI collective communication interfaces select different algorithms based on factors such as network topology, the quantity of communication submodules, and a size of transmitted data. The processor determines, based on the algorithms corresponding to the different MPI collective communication interfaces, the mode of communication between the different communication submodules. In some possible implementations, the host channel adapter is implemented by using a network interface card (NIC), an independent chip, or a chipset.

In some possible implementations, the communication submodule is a process or a thread.

According to a second aspect, an embodiment of this application provides a communication system. The communication system includes at least one second computer device. The at least one second computer device communicates with the computer device according to any implementation of the first aspect via a network.

According to a third aspect, an embodiment of this application provides a method for implementing collective communication. The method includes:

obtaining an operation request of collective communication;

converting the operation request of collective communication into a work request, and identifying a work request having no communication dependency;

directly forwarding the work request identified as having no communication dependency; and forwarding, after queue management, a work request that is not identified as having no communication dependency.

In the method, the work request having no communication dependency is directly forwarded by identifying the work request having no communication dependency. This avoids communication latency caused when the work request having no communication dependency is managed by using a queue, and can reduce resource consumption caused by performing related management, to improve overall communication performance of the collective communication.

Optionally, the operation request of collective communication is a cross-node operation request. Different nodes communicate with each other via a network. The node includes but is not limited to a device having a computer function, for example, a computer device having a computing function or a computer device having a storage function.

Optionally, the cross-node operation request of collective communication may be an operation request that needs to be quickly forwarded between a plurality of nodes and/or needs to be accurately synchronized between the plurality of nodes.

Optionally, the operation request of collective communication is an intra-node operation request, to be specific, collective operations implemented between different processes or different threads in a same node.

Optionally, before the converting an operation request of collective communication into a work request, the method further includes:

performing grid division based on a quantity of communication submodules for the collective communication and a task that needs to be executed by each communication submodule. Through the grid division, a task for implementing the operation request of collective communication is allocated to a resource in an idle mode for running, so that resource utilization can be improved.

Optionally, the identifying a work request having no communication dependency includes:

adding a first identifier to a work request having no communication dependency, where the first identifier is used to indicate that the work request is a work request having no communication dependency; and/or adding a second identifier to a work request having communication dependency, where the second identifier is used to indicate that the work request is a work request having communication dependency.

When the first identifier is added to the work request having no communication dependency, whether the received work request includes the first identifier is determined. When the received work request includes the first identifier, the work request is determined as a work request having no communication dependency. When the received work request does not include the first identifier or includes the second identifier, the work request is determined as a work request having communication dependency.

When the second identifier is added to the work request having communication dependency, whether the received work request includes the second identifier is determined. When the received work request includes the second identifier, the work request is determined as a work request having communication dependency. When the received work request does not include the second identifier, the work request is determined as a work request having no communication dependency.

In some possible implementations, the collective communication is any one of the following communication: communication between one first communication submodule and a plurality of second communication submodules, communication between a plurality of first communication submodules and one second communication submodule, and communication between the plurality of first communication submodules and the plurality of second communication submodules.

In some possible implementations, the work request is a request of communication between one of the first communication submodules and one of the second communication submodules.

In some possible implementations, the having no communication dependency means that communication between one of the first communication submodules and one of the second communication submodules does not need to depend on another communication submodule.

In some possible implementations, the method further includes:

identifying, based on a mode of communication between different communication submodules in the work request, whether the work request is a work request having no communication dependency.

In some possible implementations, the communication mode includes a mode of data transmission between two communication submodules in a work request, and whether the data transmission between the two communication submodules depends on data sent by the another communication submodule.

Optionally, the mode of data transmission between the two communication submodules in the work request is a mode of data transmission between a communication submodule serving as a data sender and a communication submodule serving as a data receiver in the work request. Correspondingly, whether the data transmission between the two communication submodules depends on data sent by another communication submodule includes: whether sending of data by the communication submodule serving as the data sender to the communication submodule serving as the data receiver depends on the data sent by the another communication submodule.

In some possible implementations, the communication mode is determined based on an interface for communication between the different communication submodules.

In some possible implementations, the first communication submodule is run by using a first computer device, the second communication submodule is run by using a second computer device, and the first computer device communicates with the second computer device via a network; and
the method further includes: directly forwarding, via the network, the work request identified as having no communication dependency, and forwarding, via the network and after the queue management, the work request that is not identified as having no communication dependency.

Optionally, the network is an InfiniBand-based network.

In some possible implementations, the forwarding, after the queue management, the work request that is not identified as having no communication dependency includes: loading the work request that is not identified as having no communication dependency into a queue, and determining whether a condition that is recorded in the queue and that triggers the work request that is not identified as having no communication dependency is met; and
when the condition is met, sending the work request that is not identified as having no communication dependency.

Optionally, the condition includes whether data sent to a communication submodule receiving data in the work request has been received. When the data sent to the communication submodule receiving data in the work request has been received, a condition for triggering a work request that does not carry the first identifier is met.

Alternatively, the condition includes whether another work request triggering the work request is already in the queue. This condition is met when the another work request triggering the work request is already in the queue. When the another work request triggering the work request is not in the queue, the condition is not met, and the processor does not trigger the work request until the condition is met.

In some possible implementations, the work request includes a plurality of work requests; and
the plurality of work requests include one or more work requests identified as having no communication dependency, and one or more work requests that are not identified as having no communication dependency.

In some possible implementations, the method further includes:
obtaining, based on the obtained operation request of collective communication, a quantity of communication submodules for the collective communication, a task that needs to be executed by each communication submodule, data transmitted between the different communication submodules, and information about a transmission mode.

In some possible implementations, the converting the operation request of collective communication into a work request includes:
converting the collective operations into the work request, and executing a control command of the work request, where the control command is used to control the work request to implement collective operations.

In some possible implementations, the collective communication is MPI-based collective communication.

In some possible implementations, the host channel adapter is implemented by using a NIC, an independent chip, or a chipset.

In some possible implementations, the communication submodule is a process or a thread.

According to a fourth aspect, a computer program product including instructions is provided. When the computer program product runs on a computer device, the computer device is enabled to perform the method according to any implementation of the third aspect.

According to a fifth aspect, an embodiment of this application provides a computer readable storage medium. The computer readable storage medium stores instructions, and the instructions instruct a computer device to perform the method according to any implementation of the third aspect.

BRIEF DESCRIPTION OF DRAWINGS

The following briefly describes the accompanying drawings for describing embodiments. It is clear that the accompanying drawings in the following descriptions show merely some embodiments of the present invention, and a person of ordinary skill in the art may derive other drawings from these accompanying drawings without creative efforts.

DESCRIPTION OF EMBODIMENTS

Figure 1:
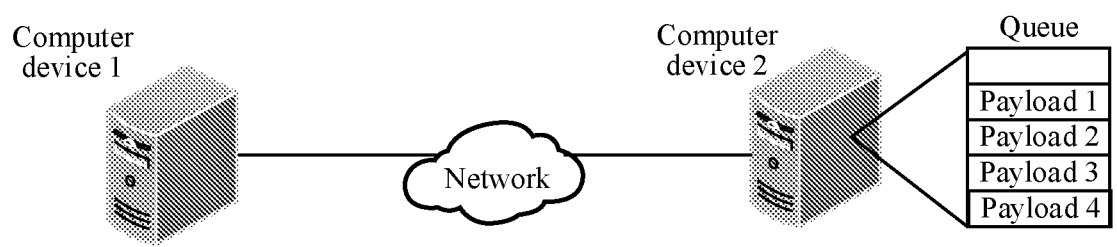
FIG. 1 is a schematic diagram of a structure for implementing collective communication according to an embodiment of this application.

The following describes embodiments of the present invention with reference to the accompanying drawings.

In the specification, claims, and accompanying drawings of this application, the terms "first", "second", and so on are intended to distinguish between similar objects but do not necessarily indicate a specific order or sequence. It should be understood that the data termed in such a way are interchangeable in proper circumstances, so that embodiments of the present invention described herein can be implemented in other orders than the order illustrated or described herein. In addition, the terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more features.

In the specification and claims of this application, the terms "include", "contain" and any other variants mean to cover a non-exclusive inclusion, for example, a process, method, system, product, or device that includes a series of steps or modules is not necessarily limited to those expressly listed steps or modules, but may include other steps or modules not expressly listed or inherent to such a process, method, product, or device. Names or numbers of steps in this application do not mean that the steps in the method procedure need to be performed in a time/logical sequence indicated by the names or numbers. An execution sequence of the steps in the procedure that have been named or numbered can be changed based on a technical objective to be achieved, provided that same or similar technical effects can be achieved. Division into units in this application is logical division. During actual application, there may be another division manner. For example, a plurality of units may be combined or integrated into another system, or some features may be ignored or not performed. In addition, the displayed or discussed mutual couplings or direct couplings or communication connections may be implemented through some interfaces. The indirect couplings or communication connections between the units may be implemented in electrical or other similar forms. This is not limited in this application. In addition, units or subunits described as separate parts may or may not be physically separate, may or may not be physical units, or may be distributed into a plurality of circuit units. All or a part of the units may be selected based on actual requirements to achieve the objectives of the solutions of this application.

It should be understood that the terms used in the descriptions of the various examples in the specification and claims of this application are merely intended to describe specific examples, but are not intended to limit the examples. Terms "one" ("a" or "an") and "the" of singular forms used in the descriptions of the various examples and the appended claims are also intended to include plural forms, unless otherwise specified in the context clearly.

It should also be understood that the term "and/or" used in the specification and claims of this application indicates and includes any or all possible combinations of one or more items in associated listed items. The term "and/or" describes an association relationship between associated objects and represents that three relationships may exist. For example, A and/or B may represent the following three cases: Only A exists, both A and B exist, and only B exists. In addition, the character "/" in this application usually indicates an "or" relationship between the associated objects.

It should be understood that determining B based on A does not mean that B is determined based on only A, and B may alternatively be determined based on A and/or other information.

It should be further understood that the term "include" (also referred to as "includes", "including", "comprises", and/or "comprising") used in this specification specifies presence of the stated features, integers, steps, operations, elements, and/or components, with presence or addition of one or more other features, integers, steps, operations, elements, components, and/or their components not excluded.

It should be further understood that the term "if" may be interpreted as a meaning "when" ("when" or "upon"), "in response to determining", or "in response to detecting". Similarly, according to the context, the phrase "if it is determined that" or "if (a stated condition or event) is detected" may be interpreted as a meaning of "when it is determined that", "in response to determining", "when (a stated condition or event) is detected", or "in response to detecting (a stated condition or event)".

It should be understood that "one embodiment", "an embodiment", and "a possible implementation" mentioned in the entire specification mean that particular features, structures, or characteristics related to the embodiment or the implementation are included in at least one embodiment of this application. Therefore, "in one embodiment", "in an embodiment", or "in a possible implementation" appearing throughout this specification does not necessarily mean a same embodiment. In addition, these particular features, structures, or characteristics may be combined in one or more embodiments by using any appropriate manner.

First, some terms and related technologies in this application is explained to facilitate understanding.

Parallel computing is based on an idea: A big problem may be divided into some small problems that can be resolved simultaneously (concurrently) by using an existing resource capability. The big problem is resolved by resolving the small problems. The parallel computing is relative to serial computing, and a feature of the serial computing is that a process sequentially runs computational algorithms according to instructions. The parallel computing is divided into two types: temporal parallelism and spatial parallelism. The temporal parallelism refers to a pipeline technology used in a central processing unit of a computer. Each instruction is divided into a plurality of steps, and the steps may be overlapped and executed in time. The spatial parallelism refers to concurrent execution of computer instructions by a plurality of processors, accelerating troubleshooting. An advantage of the parallel computing is to break a limitation of a computing capability of the serial computing, improve a computing speed, complete a computing task in a shorter period of time, better exert a computing capability of hardware, and save computing costs.

HPC refers to a complete set of computer systems with a specified level of computing capability. Because it is difficult for a single processor to implement such a powerful computing capability, the HPC needs to be jointly implemented by a plurality of central processing units (CPUs) or a plurality of hosts (for example, a plurality of computer devices). A main purpose of constructing a high-performance computing system is to improve a computing speed. To achieve a computing speed of trillion times per second, requirements on a system processor, memory bandwidth, a computing mode, an input/output (I/O) of a system, and storage are very high. Each of these links will directly affect the computing speed of the system. The HPC is mainly used to quickly complete data-intensive, compute-intensive, and I/O-intensive computing in fields such as scientific research, engineering design, finance, industry, and social management. Typical applications include bioengineering, new drug development, petroleum geophysical exploration, vehicle design (aerospace, ship, and automobile), material engineering, nuclear explosion simulation, high-tech weapon manufacturing, cryptographic research, various types of large-scale information processing, and the like. Goals of the high performance computing are to minimize computing time for completing a special computing problem, maximize a scale of a problem that can be completed within specified time, handle a large quantity of complex problems that cannot be achieved before, improve cost-effectiveness, resolve a medium-scale problem and a budget in an expansive manner, and the like.

An MPI is a message passing interface for developing a parallel program based on message passing. A purpose of the MPI is to provide a user with a practical, portable, efficient, and flexible message passing interface. The MPI may be used in a plurality of types of system architectures, such as a distributed/shared memory multi-core processor, a high-performance network, and a combination of these architectures. The MPI is also a parallel programming function library, and compilation and running of the MPI need to be combined with a specific programming language. The MPI is implemented on mainstream operating systems, including Windows and Linux systems. The MPI may be a process-level parallel software middleware. An MPI framework manages all computing processes to form a system and provides various functions for inter-process communication. A process is a running instance of a program. In addition to a program code, the process also includes an execution environment (a memory, a register, a program counter, and the like) of the process, and is an independent executable basic program unit in the operating system. The MPI may support a plurality of different communication protocols, for example, InfiniBand or a transmission control protocol (TCP). The MPI encapsulates these protocols and provides a set of unified communication interfaces to shield communication details of a bottom layer. The MPI management framework assigns a rank number to each process. The rank number sequentially starts from 0. Specific work completed by each process of an MPI program is determined based on a rank number of the process. MPI processes need to communicate within a communication domain. The communication domain is a communication environment between processes, and includes a process group, a context, virtual topology, and the like. When the MPI is started, the system establishes a global communication domain. Each process is in the global communication domain. A parameter of the communication domain needs to be specified for the inter-process communication.

Collective communication is also called group communication. An important difference between the collective communication and point-to-point communication is that a plurality of processes participate in communication at the same time. This is different from the point-to-point communication in which only two processes of a sender and a receiver are involved. Specific processes participating in the collective communication and a context of the collective communication are limited by a communication domain invoked by the collective communication. The collective communication usually includes three functions: communication, synchronization, and computing. The communication function mainly implements data transmission in a set, the synchronization function implements consistent execution progress of all processes in the set at a specific point, and the computing function is an operation on specific data. An MPI collective communication is one type of common collective communication.

InfiniBand is also referred to as "infinite bandwidth" technology, is a computer network communication standard for high performance computing, has an extremely high throughput and extremely low latency, and is used for data interconnection between computers. The InfiniBand is also used as a direct or switched interconnection between a server and a storage system, and an interconnection between storage systems.

A grid includes a plurality of independent computers, to provide an online computing and storage capability. These computer resources are distributed within a wide range. By using idle computing resources in the grid, a virtual and powerful computing platform may be created. This high-performance computer provides a possibility to deal with large-scale computing problems in fields such as biology, mathematics, and chemistry. The grid organizes interconnected computers, and integrates all types of resources and services connected in a network into a virtual computer having a great capability. For the user, the grid provides an infrastructure including various services and resources, and the user faces a resource far beyond a capacity of any single supercomputer. A powerful computing capability of the grid is used to resolve a problem. In addition, a service provided by any node in the grid may be used, regardless of a physical location of the node.

FIG. 1 is a schematic diagram of a structure for implementing collective communication. As shown in FIG. 1, four processes (for example, a process 1, a process 2, a process 3, and a process 4, which are not shown in the figure) are run in a computer device 1, and separately send data to a computer device 2 via a network. The computer device 2 receives, by using a queue, the data sent by the four processes in the computer device 1, and writes a payload sent by each process into a receive queue. After receiving the payloads of the four processes, a process (for example, a process 0, which is not shown in the figure) in the computer device 2 performs related processing (for example, summing, obtaining a maximum value, or obtaining a minimum value) and sends processed data.

When the foregoing operations are performed, due to impact of the network, the data sent by each process running on the computer device 1 disorderly arrives at the computer device 2, and time of arrival is also uncertain. The computer device 2 cannot predict generation time of each interrupt, and the interrupt is an interrupt generated when data transmitted by any one of the four processes running on the computer device 1 via the network arrives at the computer device 2. Each time the computer device 2 receives a payload sent by a process, the computer device 2 triggers an interrupt task to an operating system. When the operating system of the computer device 2 is executing a computing task by using all cores, the generated interrupt causes the operating system to stop a computing task being executed by using a part of the cores, turn to processing the interrupt, and return to executing the computing task after processing the interrupt task. When processing the interrupt, the operating system of the computer device 2 needs to save a context of a current computing task. Overall overheads are high. In this way, a scheduling program of the operating system of the computer device 2 is interfered, and generates an "operating system noise", that is, interrupt overheads generated when a message is received. The system noise causes waits of a large quantity of processes and losses of a large quantity of processor cycles (for example, CPU cycles). In most cases, processing of the data is simple, but time overheads for the interrupt and context switching are greater than time overheads for processing the data by the computer device 2. Therefore, when such an operation is implemented, execution efficiency of the computer device 2 is very low.

A manner to resolve the foregoing problem is to introduce a queue for management, and data sent by different processes is managed by using the queue. For example, when the data of the four different processes in FIG. 1 is managed by using the queue, interrupts are all triggered after completion information of four receive queues all arrives. In this way, generation of the "operating system noise" can be avoided.

However, when management is implemented by using the queue, because the different processes are not distinguished, a process that does not need to be managed is also included in a scope of queue management, resulting in low communication efficiency and resource occupation.

Figure 2:
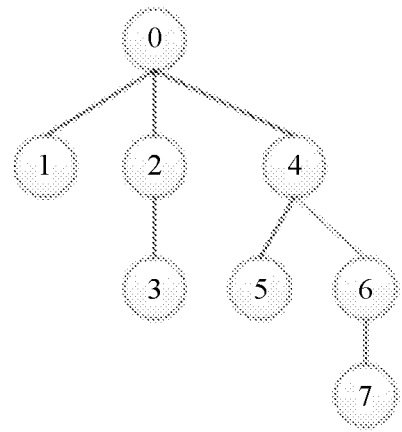
FIG. 2 is a schematic logical diagram of a data flow during communication between eight processes according to an embodiment of this application.

Broadcast communication in collective communication is used as an example. A data flow between eight processes is shown in FIG. 2. FIG. 2 is a schematic logical diagram of a data flow during communication between the eight processes. In FIG. 2, a digit in each circle represents a rank number, and a line between the circles represents a communication relationship between the processes.

When communication is implemented without queue management, a structure of queue pairs for the communication between the eight processes in FIG. 2 is shown in Table 1.

TABLE 1

| P0 | P1 | P2 | P3 | P4 | P5 | P6 | P7 |
|---|---|---|---|---|---|---|---|
| Send QP 4 Send disable Send QP 2 Send disable Send QP 1 Send disable | | Send QP 3 Send disable | | Send QP 5 Send disable Send QP 6 Send disable | | Send QP 7 Send disable | |

P0 in Table 1 represents a process 0 in FIG. 2, and so on, and P7 represents a process 7 in FIG. 2. A queue pair (QP) is a label for a queue pair. For example, the process 0 sends data to a process 4. "Send QP 4" indicates that the process 0 sends the data to a QP of the process 4, and "Send disable" indicates that send enable is canceled.

When the inter-process communication shown in FIG. 2 is managed by using the queue, a structure of queue pairs for the communication between the eight processes shown in FIG. 2 is shown in Table 2.

TABLE 2

| P0 | P1 | P2 | P3 | P4 | P5 | P6 | P7 |
|---|---|---|---|---|---|---|---|
| Send enable 4 Send enable 2 Send enable 1 | Wait recv from 0 | Wait recv from 0 Send enable 3 | Wait recv from 2 | Wait recv from 0 Send enable 5 Send enable 6 | Wait recv from 4 | Wait recv from 4 Send enable 7 | Wait recv from 6 |

It can be learned from Table 2 that, when the inter-process communication is managed by using the queue, inter-process communication having no communication dependency is also included in management. The inter-process communication may not need to be managed by using the queue, resulting in problems of prolonged communication duration and waste of resources. For example, data sent by the process 0 to the process 4, a process 2, and a process 1 in FIG. 2 may be directly sent. The data may be sent without controlling "send disable" in Table 1 by using "send enable" in queue management. To implement management in a queue manner, communication between the process 0 and the process 4, the process 2, and the process 1 needs to be loaded into the queue, and a sending function is enabled. This not only increases latency of the communication between the process 0 and the process 4, the process 2, and the process 1, but also consumes processing resources used when a network adapter executes such management.

During actual implementation, communication between some processes that perform collective communication have no dependency relationship with each other. Communication between the processes that have no dependency relationship is managed by using the queue. This not only increases the communication latency, but also consumes processor performance due to occupation of processor resources in the network adapter due to processing of the management.

An embodiment of this application provides a method for implementing collective communication. When an operation of collective communication is performed, a process that has no communication dependency may not be managed by using a queue. In this way, performance of inter-process communication having no communication dependency in the collective communication can be improved, overall latency of the collective communication can be reduced, and resource occupation and consumption caused by management of the inter-process communication having no communication dependency can be avoided. Collective communication by using an MPI is used as an example. When an upper-layer application (an HPC application, a big data application, or the like) uses the MPI as a communication component, overall performance of the upper-layer application can be accelerated in an end-to-end manner. For example, in a typical application in the molecular dynamics field of the HPC industry, time for MPI collective communication accounts for 40% of entire end-to-end running time. If performance of the MPI collective communication is accelerated, overall end-to-end performance of the application can be accelerated.

First, a device that implements the method for implementing collective communication provided in embodiments of this application is described.

Figure 3A:
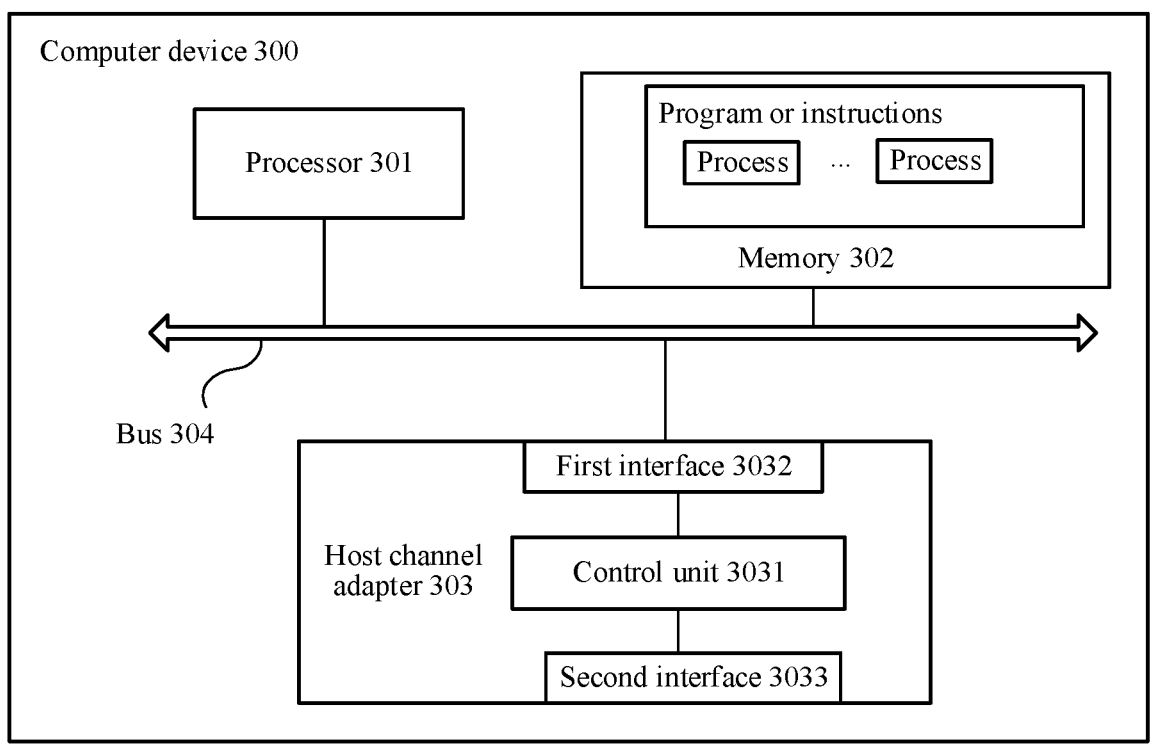
FIG. 3A is a schematic diagram of a structure of a computer device 300 according to an embodiment of this application.

FIG. 3A is a schematic diagram of a structure of a computer device 300 according to an embodiment of this application. As shown in FIG. 3A, the computer device 300 includes a processor 301, a memory 302, a host channel adapter (HCA) 303, and a bus 304. The processor 301, the memory 302, and the host channel adapter 303 communicate with each other through the bus 304. The bus 304 may be a peripheral component interconnect (PCI) bus, a peripheral component interconnect express (PCIe) bus, an extended industry standard architecture (EISA) bus, or the like. The bus may be classified into an address bus, a data bus, a control bus, and the like. For ease of representation, only one bold line is used to represent the bus in FIG. 3A, but this does not mean that there is only one bus or only one type of bus. The host channel adapter 303 is connected to another computer device via a network.

In FIG. 3A, the processor 301 may be a chip having a computing capability, for example, a CPU, a graphics processing unit (GPU), a general-purpose graphics processing unit (GPGPU), a tensor processing unit (TPU), a data processing unit (DPU), a microprocessor (MP), or a digital signal processor (DSP).

The memory 302 may include a volatile memory, for example, a random access memory (RAM), or may include a non-volatile memory, for example, a read-only memory (ROM), a flash memory, an HDD, or an SSD. The memory 302 stores a program or instructions, for example, including a program code of at least one process or a program code of at least one thread. Certainly, the memory 302 may further store data, including but not limited to data that needs to be stored by the computer device 300.

The host channel adapter 303 includes a control unit 3031, a first interface 3032, and a second interface 3033. The first interface 3032 is an interface through which the host channel adapter 303 communicates with the processor 301. The first interface 3032 receives, through the bus 304, a request sent by the processor 301, and converts the received request into a format that can be recognized by the host channel adapter 303, or converts data or a packet that is sent by the host channel adapter 303 to the processor 301 into a format that can be recognized by the processor 301. The control unit 3031 receives, through the first interface 3032, the request sent by the processor 301, and performs corresponding processing on the received request. The second interface 3033 is an interface for connecting the computer device 300 to a network. The host channel adapter 303 receives, through the second interface 3033, a request or data sent by another computer device via the network, or sends a request or data to another computer device via the network. Optionally, the second interface 3033 may include a plurality of ports and be connected to the network through the plurality of ports, to implement synchronous transmission on a plurality of paths.

In an implementation, the host channel adapter 303 may be implemented by using a NIC. In another implementation, the host channel adapter 303 may alternatively be implemented by using a chipset or an independent chip.

It should be noted that FIG. 3A shows merely some hardware components and software components for ease of describing embodiments of this application. During specific implementation, the computer device 300 may further include another hardware component, for example, a hard disk, or may include other software, for example, an application program or an operating system. A structural composition shown in FIG. 3A should not be used as a limitation on embodiments of this application.

Figure 3B:
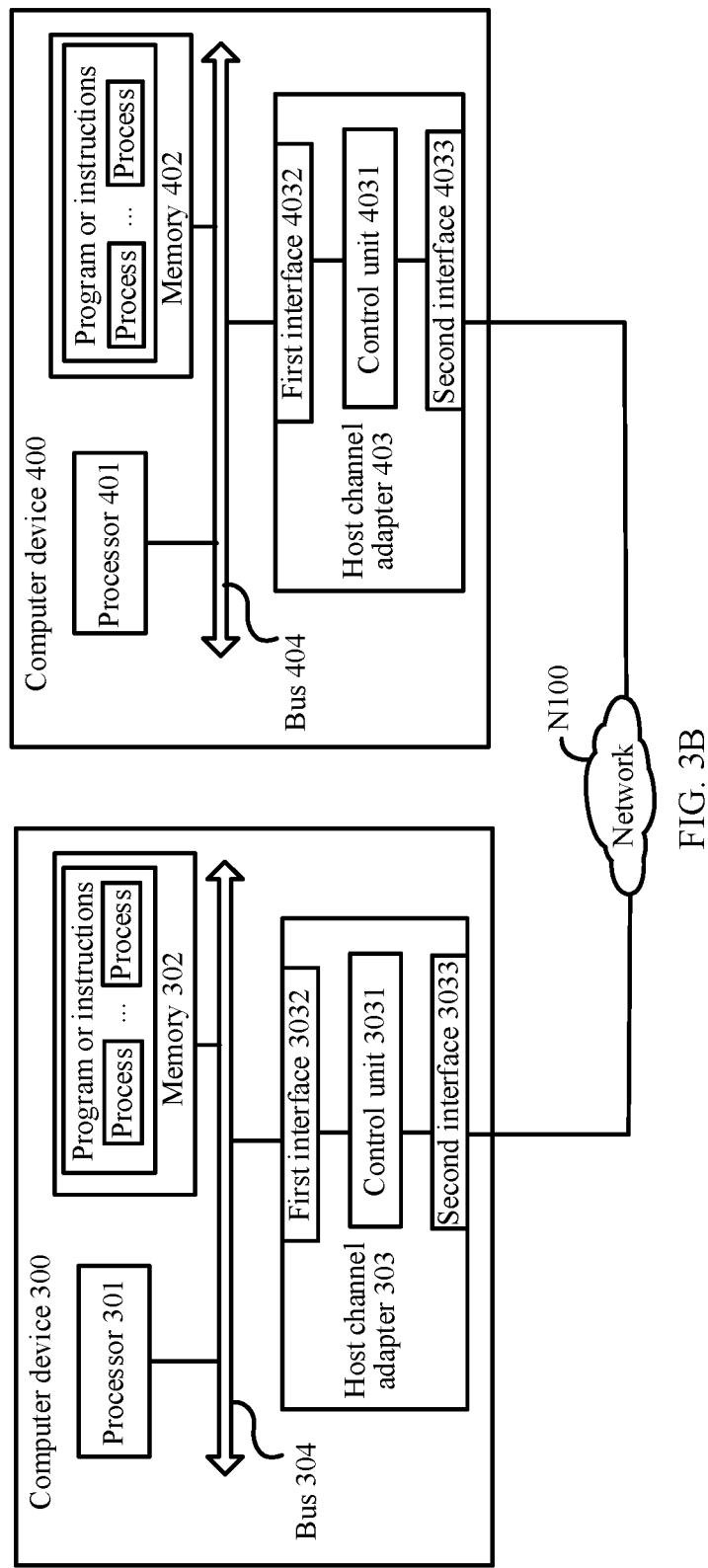
FIG. 3B is a schematic diagram of a structure of a system according to an embodiment of this application.

FIG. 3B is a schematic diagram of a structure of a system according to an embodiment of this application. As shown in FIG. 3B, the system includes a computer device 300 and a computer device 400. The computer device 300 is connected to the computer device 400 via a network N100. The network N100 between the computer device 300 and the computer device 400 may be an InfiniBand-based network. For example, an InfiniBand architecture is used as an interconnection solution between the computer device 300 and the computer device 400. Optionally, the network N100 between the computer device 300 and the computer device 400 may alternatively be an Ethernet network (Ethernet), a remote direct memory access over converged Ethernet (RoCE) network, or the like.

Composition of the computer device 400 is similar to that of the computer device 300. The computer device 400 includes a processor 401, a memory 402, a host channel adapter 403, and a bus 404. The processor 401, the memory 402, and the host channel adapter 403 communicate with each other through the bus 404. The memory 402 stores a program or instructions, for example, including a program code of at least one process. The host channel adapter 403 includes a control unit 4031, a first interface 4032, and a second interface 4033.

A request initiated by a process running on the computer device 300, for example, a request for sending data to the process running on the computer device 400, is transmitted to the computer device 400 via the network N100. A related process running on the computer device 400 performs corresponding processing based on the received request. In an implementation, one or more processes in the computer device 300 implements MPI collective communication with one or more processes in the computer device 400 via the network N100.

The following further describes the collective communication method provided in embodiments of this application by using an example in which an application program running on the computer device 300 initiates MPI collective operations to implement communication with the computer device 400.

Figure 4:
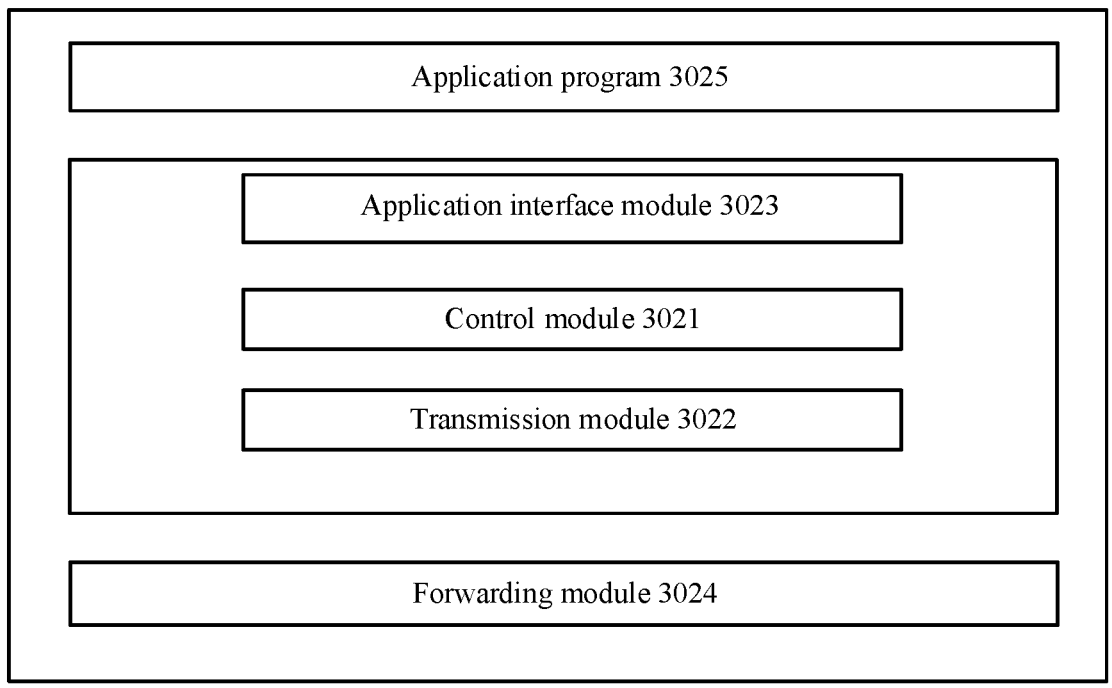
FIG. 4 is a schematic diagram of a logical structure of a program or instructions that need to be executed by a processor 301 according to an embodiment of this application.

The processor 301 in the computer device 300 reads the program or instructions in the memory 302, to implement a corresponding function of the MPI collective communication. FIG. 4 is a schematic diagram of a logical structure of the program or instructions that need to be executed by the processor 301. As shown in FIG. 4, the memory 302 includes an application program 3025, an application interface module 3023, a control module 3021, a transmission module 3022, and a forwarding module 3024. The application interface module 3023, the control module 3021, and the transmission module 3022 constitute an MPI layer, and the MPI layer is a unified communication framework implemented based on an MPI standard.

The application program 3025 may be any application that implements collective communication, including but not limited to an HPC industry application, an HPC-AI industry application, a big data industry application, and the like. These applications usually need a large quantity of computing tasks. To execute the large quantity of computing tasks, a plurality of processes or threads are usually started. Therefore, a collective communication interface of the MPI needs to be invoked for data computing and inter-process information exchange. For example, the application program 3025 may be an application WRF (Weather Research and Forecasting) in the meteorological field, an application OpenFoam in computational fluid dynamics, an application VASP (Vienna Ab initio Simulation Package) in the molecular dynamics field, or the like.

The application interface module 3023 is an interface between an MPI application layer and the application program 3025, and is configured to receive, from the application program 3025, a task that needs to be executed. For example, the application interface module 3023 may receive an operation request of the collective communication triggered by the application program 3025.

The control module 3021 is configured to convert, based on the operation request delivered by the application program 3025, the operation request into a work request (WR). For example, the conversion by the control module 3021 includes but is not limited to: performing grid division based on a computing instance to be computed, determining a process that needs to be executed, a task that needs to be executed by each process, a communication mode of communication between processes, and the like. For example, the control module 3021 may be a unified communication group (UCG).

The transmission module 3022 is configured to: abstract a difference between architectures of different hardware (for example, different network adapters), and provide a low-level application programming interface (API). The low-level API is configured to implement the collective communication. For example, the transmission module 3022 may be unified communication transport (UCT).

The forwarding module 3024 is configured to forward a message or data between an API layer and the host channel adapter 303. For example, the forwarding module 3024 may be an open fabrics enterprise distribution (OFED). After the control module 3021 invokes an interface of the transmission module 3022 to notify the transmission module 3022 of a WR that needs to be executed, the transmission module 3022 notifies the host channel adapter 303 by invoking an externally exposed interface of the OFED to knock on a doorbell of the hardware, and sends the WR to the host channel adapter 303 for parsing and processing. In an implementation, OFED may be an open source implementation of remote direct memory access (RDMA) and kernel bypass.

Figure 5A:
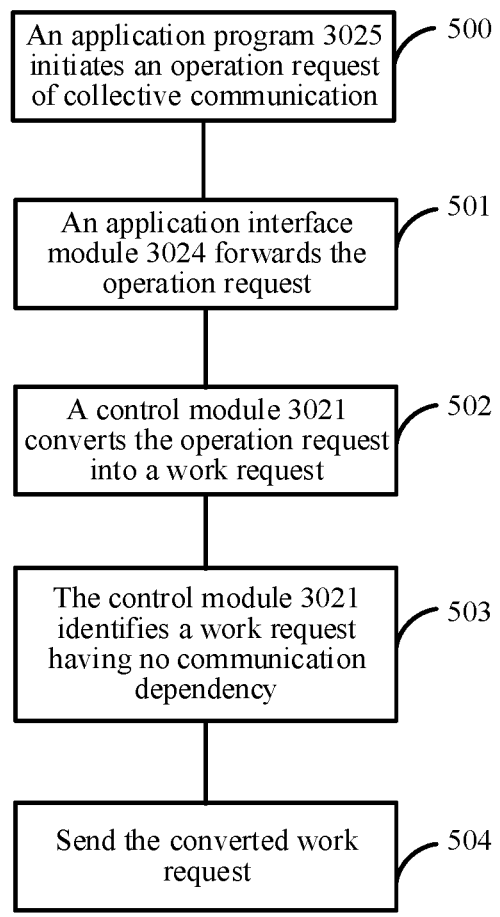
FIG. 5A is a schematic flowchart of a method for identifying a work request to have no communication dependency according to an embodiment of this application.

FIG. 5A is a schematic flowchart of a method for identifying a work request to have no communication dependency according to an embodiment of this application. As shown in FIG. 5A, with reference to the software modules shown in FIG. 4, the method includes the following steps.

Step 500: The application program 3025 initiates an operation request of collective communication.

In an implementation, the operation request of collective communication is a cross-node collective operation request, and different nodes communicate with each other via a network to implement the collective communication. For example, the cross-node operation request of collective communication may be an operation request that needs to be quickly forwarded between a plurality of nodes and/or needs to be accurately synchronized between the plurality of nodes. The node may be a computer device, including but not limited to a computer device that implements a computing function or a computer device that implements a storage function.

In another implementation, the operation request of collective communication is an intra-node operation request, to be specific, collective operations implemented between different processes or different threads in a same node.

Specifically, the application program 3025 may initiate the operation request of collective communication by using a command for initiating collective operations. Optionally, the command for collective operations may be an MPI command or a shared memory command. The MPI command is used as an example. The MPI command includes but is not limited to MPI_max, MPI min, MPI_sum, MPI_scatter, MPI_reduce, or the like.

Step 501: The application interface module 3023 receives the operation request initiated by the application program 3025, and forwards the operation request to the control module 3021.

After receiving the operation request initiated by the application program 3025, the application interface module 3023 may perform general processing on the received operation request, and send obtained information to the control module 3021. The processing performed by the application interface module 3023 on the operation request includes but is not limited to: obtaining information such as a quantity of processes in the collective communication, a task that needs to be executed by each process, a size of data transmitted between the processes, or a communication domain.

After obtaining the information, the application interface module 3023 sends or transfers the information to the control module 3021. It may be understood that there may be another software module between the application interface module 3023 and the control module 3021, for example, a software module that implements MPI communication based on an MPI communication protocol, and the application interface module 3023 may send or transfer the obtained information to the control module 3021 through the module. From a perspective of brief description, in this embodiment of this application, only sending or transmission of the obtained information to the control module 3021 by the application interface module 3023 is described.

Step 502: The control module 3021 converts the operation request of collective communication into a work request based on the information obtained from the application interface module 3023.

In an implementation, the control module 3021 converts the operation request of collective communication into the work request based on the information obtained from the application interface module 3023.

In another implementation, the control module 3021 may convert, based on the information obtained from the application interface module 3023, the collective operations into a work request and a control command for executing the work request. The control command is used to control the work request to implement collective operations.

During specific implementation, the control module 3021 may convert, based on an MPI library stored in the memory 302 and in combination with the information obtained from the application interface module 3023, the collective operations into the work request, or convert the collective operations into the work request and the control command for executing the work request.

For example, the converting, based on the information obtained from the application interface module 3023, the collective operations into a work request and a control command for executing the work request includes the following steps.

Step S1: The control module 3021 performs grid division based on the quantity of processes in the collective communication and the task that needs to be executed by each process, and allocates a computer device that runs the processes in the collective communication.

If the processes that implement the collective communication need to communicate via a network, different computer devices that communicate via the network need to be allocated to separately perform tasks of the collective communication. The system shown in FIG. 3B is used as an example. The computer device 300 and the computer device 400 are separately configured to run related processes, to implement the collective communication via the network. For example, the collective communication is communication between a root process 0 and three subprocesses (a subprocess 1, a subprocess 2, and a subprocess 3). The root process 0 first needs to receive data from the subprocess 1, the subprocess 2, and the subprocess 3 and perform a reduction operation, and sends the data obtained after the reduction operation to the subprocess 1, the subprocess 2, and the subprocess 3. The control module 3021 may allocate the computer device 300 to run the root process 0, and allocate the computer device 400 to run the subprocess 1, the subprocess 2, and the subprocess 3. The root process 0 implements the collective communication with the subprocess 1, the subprocess 2, and the subprocess 3 via the network N100.

If the processes for implementing the collective communication do not need to implement communication via the network, only the computer device 300 may be allocated to perform the tasks of the collective communication. The communication between the root process 0 and the three subprocesses (the subprocess 1, the subprocess 2, and the subprocess 3) is still used as an example. The root process 0, the subprocess 1, the subprocess 2, and the subprocess 3 are all run on the computer device 300. The root process 0 may implement communication with the subprocess 1, the subprocess 2, and the subprocess 3 via the host channel adapter 303.

Step S2: The control module 3021 determines a mode of implementing the collective communication between the processes.

Specifically, the control module 3021 may first select, from the MPI library, an MPI collective communication interface used for the inter-process communication. The MPI collective communication interface includes but is not limited to MPI_Bcast, MPI_Allreduce, MPI_Alltoall, or the like. Different MPI collective communication interfaces select different algorithms based on factors such as network topology, the quantity of processes, and the size of transmitted data. Common algorithms include but are not limited to Binomial Tree, K-nomial Tree, Recursive doubling, or the like. The algorithm is specifically used to determine the mode of the inter-process communication.

The control module 3021 determines, by selecting different MPI collective communication interfaces and based on an algorithm applicable to each type of communication interface, a manner of implementing the collective communication between the processes.

Step 503: The control module 3021 identifies a work request having no communication dependency, and adds an identifier to the work request having no communication dependency.

Figure 5B:
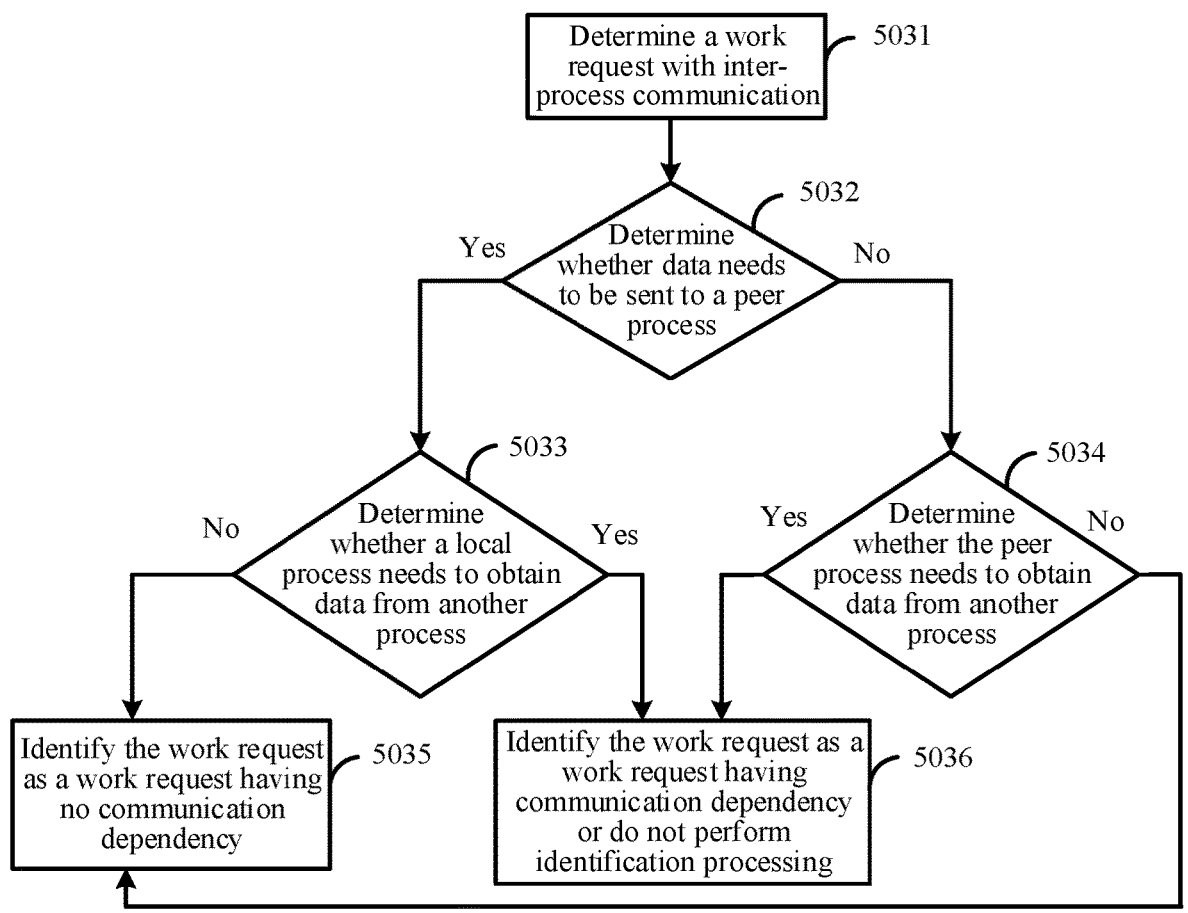
FIG. 5B is a schematic flowchart of a process in which a control module 3021 identifies a work request having no communication dependency according to an embodiment of this application.

For a process in which the control module 3021 identifies the work request having no communication dependency, refer to a procedure shown in FIG. 5B.

After identifying the work request having no communication dependency, the control module 3021 may add identification information to the work request having no communication dependency, to identify that the work request is the work request having no communication dependency. The added identification information may be in any form, and the added identification information may be at any location in the work request.

For example, an extended attribute may be added to Opcode in the work request, to add the identification information. For example, a composition of the work request may be shown in Table 3:

TABLE 3

| wr_id | *next | ... | Opcode | Send_flags | ... |
|-------|-------|-----|--------|------------|-----|

The control module 3021 may add an identifier SEND_DIRECTLY to Opcode in the work request shown in Table 3, to identify that the work request is a work request having no communication dependency.

Step 504: Send the work request converted by the control module 3021 to the host channel adapter 303.

Specifically, the transmission module 3022 transmits the work request converted by the control module 3021 to the forwarding module 3024, and the forwarding module 3024 sends the work request to the host channel adapter 303. To be specific, the processor 301 transmits, to the forwarding module 3022 by executing a program of the transmission module 3022, the work request converted by the control module 3021, and sends the work request to the host channel adapter 303 by executing a program of the forwarding module 3024. In an implementation, the processor 301 may convert, by executing the program of the forwarding module 3024, the work request into a format that can be recognized by the host channel adapter 303, and send, through the first interface 3032, the work request whose format is converted to the host channel adapter 303.

It may be understood that the control module 3021 obtains a plurality of work requests after converting the operation request of collective communication. Some of the work requests are work requests having communication dependency, and some of the work requests are work requests having no communication dependency. The work request sent by the processor 301 to the host channel adapter includes the work request that has no communication dependency and to which the identifier is added, and also includes the work request having communication dependency. In this way, the host channel adapter can identify, based on the identifier, the work request having no communication dependency, and directly forward the work request.

For any work request, the control module 3021 may determine, based on a mode of communication between processes in the work request, whether the work request has no communication dependency. FIG. 5B is a schematic flowchart of a method for identifying whether a work request is a work request having no communication dependency according to an embodiment of this application. As shown in FIG. 5B, the method includes the following steps.

Step S031: The control module 3021 determines a work request with inter-process communication.

In step 502, the control module 3021 converts the collective operations into one or more work requests. The control module 3021 needs to first determine a work request, and determine whether the work request is a work request having no communication dependency. Determining whether a work request is a work request having no communication dependency is determining whether communication between processes having a communication relationship in the work request needs to depend on another process.

An example in which a local process is a process A and a peer process is a process B in a work request is used below for description.

Step S032: The control module 3021 determines whether the local process (the process A) needs to send data to the peer process (the process B).

If the local process (the process A) needs to send data to the peer process (the process B), step S033 is performed. If the local process (the process A) does not need to send data to the peer process (the process B), it indicates that the local process (the process A) needs to receive data sent by the peer process (the process B), and step S034 is performed.

Step S033: The control module 3021 determines whether the data sent by the local process (the process A) to the peer process (the process B) is obtained from another process (for example, a process C, where the process C is used to represent the another process below for description). If the data is not obtained from the another process (the process C), step S035 is performed. If the data is obtained from the another process (the process C), step S036 is performed.

Step S034: The control module 3021 determines whether the data sent by the peer process (the process B) to the local process (the process A) is obtained from the another process (the process C). If the data is not obtained from the another process (the process C), step S035 is performed. If the data is obtained from the another process (the process C), step S036 is performed.

Step S035: The control module 3021 identifies that the work request is a process having no communication dependency.

If the data sent by the local process (the process A) to the peer process (the process B) is not obtained from the another process (the process C), it indicates that communication between the local process (the process A) and the peer process (the process B) does not depend on the another process. The work request in which the local process (the process A) sends the data to the peer process (the process B) is a work request having no communication dependency.

After identifying the work request having no communication dependency, the control module 3021 identifies the work request having no communication dependency. In an implementation, a first identifier may be added to identify the work request having no communication dependency. The first identifier is used to indicate that the work request is a work request having no communication dependency.

Optionally, the first identifier may be added to an Opcode field in the work request. For example, the added first identifier is IBV_SEND_DIRECTLY Step S036: The control module 3021 identifies that the work request is a work request having communication dependency or does not perform identification processing.

If the data sent by the local process (the process A) to the peer process (the process B) is obtained from the another process (the process C), it indicates that communication between the local process (the process A) and the peer process (the process B) needs to depend on communication with the another process. The work request in which the local process (the process A) sends the data to the peer process (the process B) is a work request having communication dependency.

After identifying the work request having communication dependency, the control module 3021 may identify the work request having communication dependency, or may not perform identification processing. If identification processing is not performed, it indicates that the work request is different from the work request having no communication dependency.

In an implementation, the work request having communication dependency may be identified by adding a second identifier to identify the work request having communication dependency. The second identifier is used to indicate that the work request is a work request having communication dependency.

Optionally, the second identifier may be added to the Opcode field in the work request. For example, the added second identifier may be IBV_SEND.

It should be noted that the software modules in FIG. 5A and FIG. 5B perform corresponding steps, but during specific implementation, the processor 301 implements corresponding functions by executing programs of the software modules. That is, the processor implements the method procedures shown in FIG. 5A and FIG. 5B by executing corresponding programs stored in the memory 302.

Figure 6:
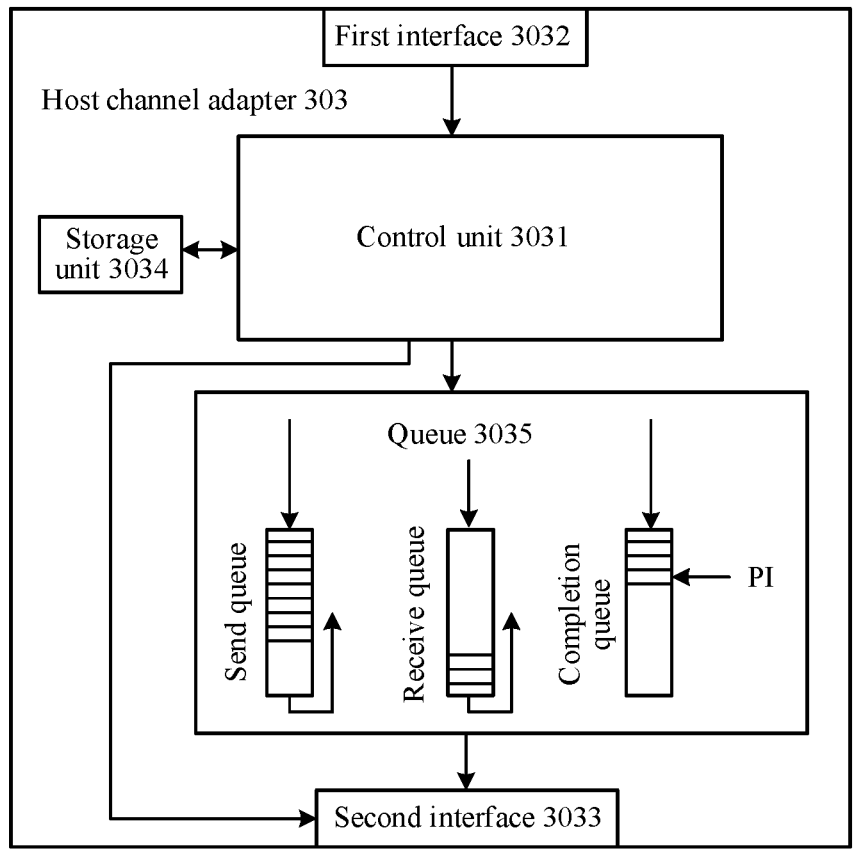
FIG. 6 is a schematic diagram of a specific structure of a host channel adapter 303 according to an embodiment of this application.

FIG. 6 is a schematic diagram of a specific structure of a host channel adapter 303 according to an embodiment of this application. As shown in FIG. 6, the host channel adapter 303 further includes a queue 3035 and a storage unit 3034.

The storage unit 3034 is connected to a control unit 3031, and is configured to: store a program or code for implementing a corresponding function of the control unit 3031, and store data that needs to be processed by the control unit 3031.

The queue 3035 includes a plurality of work queues (WQs). Each work queue includes a plurality of work queue entries (WQEs). Each WQE includes information related to a network event, for example, may be information for sending a message to another node via a network or information for receiving a message from the another node via the network. The work queue is implemented by using at least one QP. Each QP includes a receive queue (RQ) and a send queue (sSQ). One QP is usually corresponding to one QP in a peer node. In this way, point-to-point transmission can be implemented. The receive queue is mainly used to receive the WQEs, and the send queue is mainly used to send related WQEs. The queue 3035 further includes a completion queue (CQ). The completion queue records a completion status of the WQE. Each entry in the completion queue is corresponding to one WQE. For example, the completion queue may be associated with a preset group of receive queues, and the group of receive queues are used to receive a message waiting to be received. A producer index (PI) is used to indicate a recently completed entry in the completion queue. Optionally, the PI may alternatively be used to indicate a recently processed WQE in the work queue. For example, when the completion queue is associated with the preset group of receive queues, and the group of receive queues are used to receive the message waiting to be received, the control unit 3031 indicates that the message waiting to be received is received by identifying the PI in the completion queue. FIG. 6 shows only various queues for brevity, and shows only one SQ, RQ, and CQ. However, this does not mean that the queue 3035 includes only these queues. During specific implementation, the queue 3035 may further include a plurality of SQs, a plurality of RQs, or a plurality of CQs. Details are not described.

In another implementation, the control unit 3031 may alternatively determine whether a work request loaded into the queue 3035 is a data work request or a management work request. If the data work request is received, it is determined whether a management work request that triggers the data work request already exists in the queue 3035. When the management work request that triggers the data work request already exists in the queue 3035, the data work request is triggered based on the management work request. When there is no management work request that triggers the data work request in the queue 3035, the data work request is stored in the receive queue, and the management work request that triggers the data work request is waited for. If the management work request is received, it is determined whether a data work request to be triggered by the management work request already exists in the queue 3035. When the data work request to be triggered by the management work request already exists in the queue 3035, the data work request is triggered based on the management work request. When there is no data work request to be triggered by the management work request in the queue 3035, the management work request is stored in the receive queue, and the data work request to be triggered by the management work request is waited for.

In this embodiment of this application, the queue 3035 and the storage unit 3034 may be implemented by using a RAM, for example, may be implemented by using a static random access memory (SRAM) or a dynamic random access memory (DRAM). The queue 3035 and the storage unit 3034 may be embedded in the control unit 3031 or independent of the host channel adapter 303.

Optionally, the control unit 3031 may further include a computation subunit (not shown in FIG. 6), configured to execute a related computing task in the work request. For example, the computation subunit may be an arithmetic logical unit (ALU). The computation subunit may be embedded in the control unit 3031, or may be a subunit independent of the control unit 3031 in the host channel adapter 303, and is controlled by the control unit 3031.

In an implementation, the control unit 3031 and/or the computation subunit may be implemented by using a field programmable gate array (FPGA) and/or an application-specific integrated circuit (ASIC).

As shown in FIG. 6, after receiving a work request sent by the processor 301, a first interface 3032 sends the received work request to the control unit 3031. In this embodiment of this application, the control unit 3031 determines whether the received work request including an identifier having no communication dependency.

In an implementation, the control unit 3031 may determine, by determining whether the received work request includes a first identifier, whether the received work request is a work request having no communication dependency. When the received work request includes the first identifier, it is determined that the work request is a work request having no communication dependency; or when the received work request does not include the first identifier, it is determined that the work request is a work request having communication dependency. For example, after receiving a work request forwarded by the first interface 3032, the control unit 3031 first parses whether an Opcode field in the received work request includes IBV_SEND_DIRECTLY If IBV_SEND_DIRECTLY is included, it is determined that the work request is a work request having no communication dependency. If IBV_SEND_DIRECTLY is not included, it is determined that the work request is a work request having communication dependency.

In another implementation, the control unit 3031 may determine, by determining whether the received work request includes a second identifier, whether the received work request is a work request having no communication dependency. When the received work request does not include the second identifier, it is determined that the work request is a work request having no communication dependency; or when the received work request includes the second identifier, it is determined that the work request is a work request having communication dependency.

The control unit 3031 directly sends the work request having no communication dependency to a second interface 3033, to send the work request via the network. For the work request having communication dependency, the control unit 3031 loads the work request into the queue 3035, controls sending of the work request by using the queue, and sends the work request via the network and through the second interface 3033 when a condition for executing the work request is met.

For example, that the control unit 3031 manages sending of the work request by using the queue may include the following manners:

The control unit 3031 first determines whether a condition for triggering a work request that has a communication dependency on the work request is met. If the condition is not met, the work request is stored in the receive queue for waiting. If the condition is met, sending of the work request is triggered, and the work request is sent via the network and through the second interface 3033. For example, in the foregoing example, the data sent by the process A to the process B needs to wait for the process C to send data to the process A. After receiving the work request that the process A sends the data to the process B, the control unit 3031 loads the work request into the receive queue in the queue 3035, and determines whether the process A receives the data sent by the process C, that is, determines whether the completion queue of the queue 3035 includes a completion record in which the process C sends the data to the process A. If the process A has not received the data sent by the process C, the control unit 3031 stores, in the receive queue, the work request that the process A sends the data to the process B. After the work request that the process C sends the data to the process A is completed, a WQE of the completion is recorded in the completion queue. When an entry indicated by a PI indicates that the process C has sent the data to the process A, the condition for the work request that the process A sends the data to the process B is met. The control unit 3031 extracts, from the receive queue, the work request that the process A sends the data to the process B, and sends the work request via the network and through the second interface 3033.

According to the foregoing implementation provided in this embodiment of this application, the processor 301 identifies the work request having no communication dependency. After receiving a work request of collective operations that is sent by the processor 301, the host channel adapter 403 directly sends the work request having no communication dependency via the network. This avoids communication latency caused when the work request having no communication dependency is managed by using the queue, and can reduce resource consumption caused by performing related management y the host channel adapter 303. The work request having no communication dependency is directly sent via the network, and more interrupts are triggered because queue management is not performed. However, latency and resource consumption caused by these interrupts are far less than those caused by the queue management. Therefore, overall communication performance of collective communication can be improved by using the implementation provided in this embodiment of this application.

In the foregoing embodiment, an example in which the collective operations are implemented by using the MPI is used to describe the solution provided in this embodiment of this application. Embodiments of this application are not limited thereto. For the collective operations implemented in another manner, reference may also be made to the foregoing implementation. Details are not described.

Figure 7:
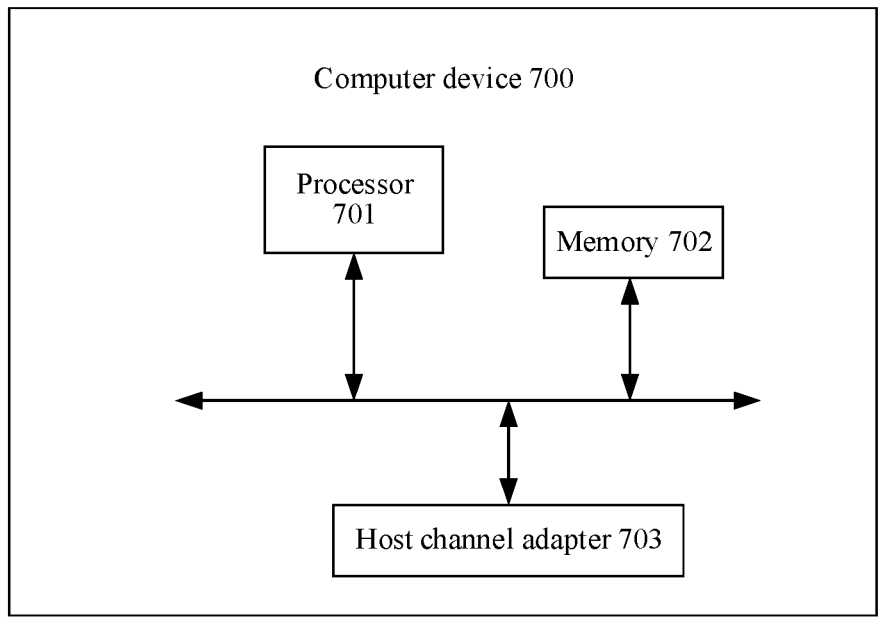
FIG. 7 is a schematic diagram of a structure of a computer device 700 according to an embodiment of this application.

FIG. 7 is a schematic diagram of a structure of a computer device 700 according to an embodiment of this application. As shown in FIG. 7, the computer device 700 includes a processor 701, a memory 702, and a host channel adapter 703. The processor 701, the memory 702, and the host channel adapter 703 are connected to each other through a bus.

The memory 702 stores a computer executable program. The processor 701 is configured to execute the computer executable program, to implement the following operations:
converting an operation request of collective communication into a work request, and identifying a work request having no communication dependency; and sending the work request to the host channel adapter 703; and
the host channel adapter 703 is configured to: determine whether the received work request is a work request having no communication dependency; and directly forward a work request identified as having no communication dependency, and forward, after queue management, a work request that is not identified as having no communication dependency.

For a specific implementation of the computer device 700 shown in FIG. 7, refer to the implementation of the computer device 300 shown in FIG. 3A and the implementations shown in FIG. 5A and FIG. 5B. For example, the foregoing communication submodule may be a process or the like described in FIG. 5A and FIG. 5B. Details are not described.

By using the computer device 700 shown in FIG. 7, the processor 701 identifies the work request having no communication dependency. After receiving the work request of collective operations that is sent by the processor 701, the host channel adapter 703 directly sends the work request having no communication dependency via a network. This avoids communication latency caused when the work request having no communication dependency is managed by using a queue, and can reduce resource consumption caused by performing related management by the host channel adapter 703, to improve overall communication performance of the collective communication.

Figure 8:
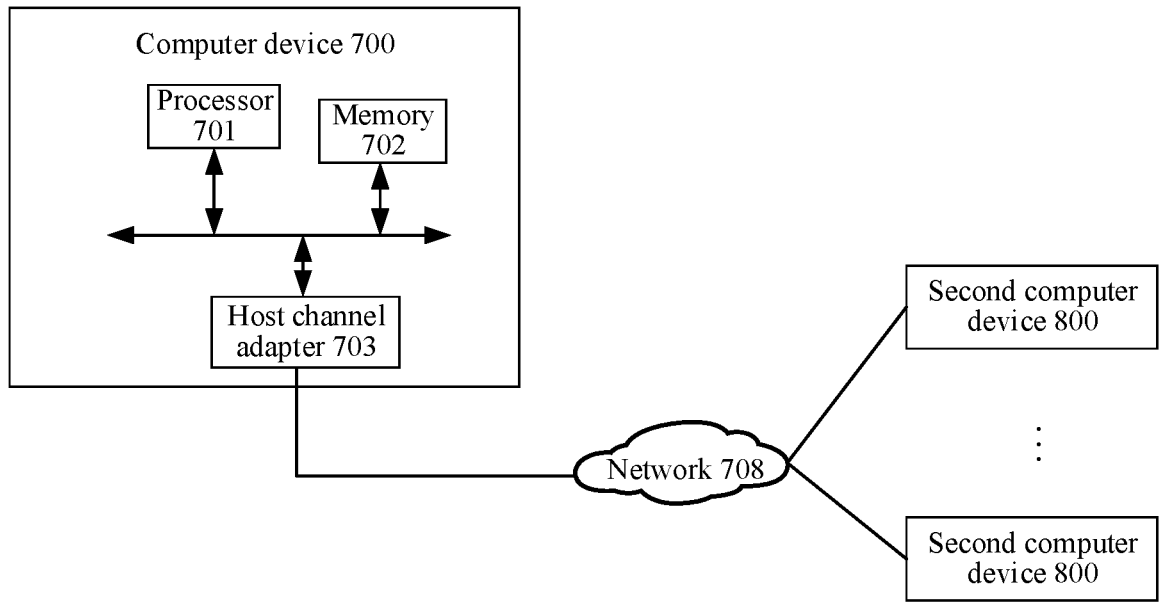
FIG. 8 is a schematic diagram of a structure of a communication system according to an embodiment of this application.

FIG. 8 is a schematic diagram of a structure of a communication system according to an embodiment of this application. As shown in FIG. 8, the communication system includes at least one second computer device 800, and the at least one second computer device 800 communicates with the computer device 700 in FIG. 7 via a network 708.

The embodiment shown in FIG. 8 may be implemented with reference to the implementation of the system shown in FIG. 3B. Specifically, the second computer device 800 may be implemented with reference to the implementation of the computer device 400 in FIG. 3B. In FIG. 8, there may be one or more second computer devices 800, and the computer device 700 may communicate with the one or more second computer devices 800 via the network 708.

An implementation of communication between the computer device 700 and the second computer device 800 in FIG. 8 may be implemented with reference to the implementations shown in FIG. 3B, FIG. 5A, and FIG. 5B. Details are not described again.

Figure 9:
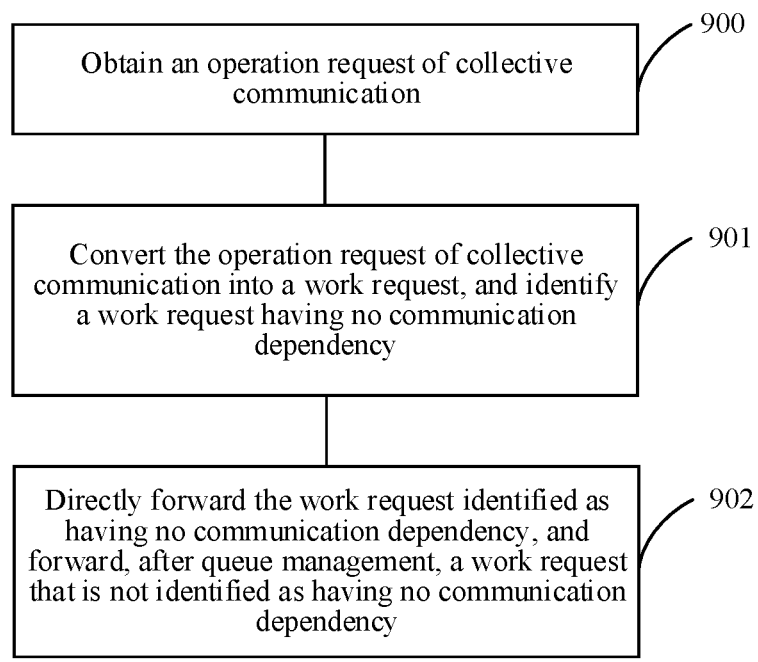
FIG. 9 is a schematic flowchart of a method for implementing collective communication according to an embodiment of this application.

FIG. 9 is a schematic flowchart of a method for implementing collective communication according to an embodiment of this application. As shown in FIG. 9, the method includes the following steps.

Step 900: Obtain an operation request of collective communication.

Step 901: Convert the operation request of collective communication into a work request, and identify a work request having no communication dependency.

Step 902: Directly forward the work request identified as having no communication dependency, and forward, after queue management, a work request that is not identified as having no communication dependency.

The method shown in FIG. 9 may be implemented by using a computer device, for example, may be implemented by using the computer device 300 in FIG. 3A. In addition, the method shown in FIG. 9 may alternatively be implemented with reference to the implementations shown in FIG. 5A and FIG. 5B. Details are not described again.

In the method shown in FIG. 9, the work request having no communication dependency is directly forwarded via a network by identifying the work request having no communication dependency. This avoids communication latency caused when the work request having no communication dependency is managed by using a queue, and can reduce resource consumption caused by performing related management, to improve overall communication performance of the collective communication.

A person of ordinary skill in the art may be aware that, in combination with the examples described in embodiments disclosed in this specification, units and algorithm steps can be implemented by electronic hardware, computer software, or a combination thereof. To clearly describe the interchangeability between the hardware and the software, the foregoing has generally described compositions and steps of each example based on functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

In the several embodiments provided in this application, it should be understood that the disclosed system, device, and method may be implemented in other manners. For example, division into the modules is merely logical function division and may be another division during actual implementation. For example, a plurality of modules or components may be combined or integrated. In addition, the displayed or discussed mutual couplings or direct couplings or communication connections may be indirect couplings or communication connections through some interfaces, apparatuses, or units.

When the integrated module is implemented in the form of a software functional unit and sold or used as an independent product, the integrated module may be stored in a computer-readable storage medium. Based on such an understanding, the technical solutions of the present invention essentially, or the part contributing to the prior art, or all or some of the technical solutions may be implemented in the form of a software product. The computer software product is stored in a storage medium and includes several instructions for instructing a computer device (which may be a personal computer, a server, or a network device) to perform all or some of the steps of the methods described in embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A computer device, comprising a processor, a memory, and a host channel adapter, wherein:
   the memory is configured to store a computer executable program;
   the processor is configured to execute the computer executable program, to implement the following operations:
      converting an operation request of collective communication into a work request, and identifying a work request having no communication dependency; and sending the work request to the host channel adapter; and
   the host channel adapter is configured to: determine whether the received work request is a work request having no communication dependency, wherein the work request having no communication dependency is a request of communication between one of first communication submodules and one of second communication submodules which does not need to depend on another communication submodule; and directly forward a work request identified as having no communication dependency, and forward, after queue management, a work request that is not identified as having no communication dependency.

2. The computer device according to claim 1, wherein the collective communication is any one of the following communication:
   communication between one first communication submodule and a plurality of second communication submodules,
   communication between a plurality of first communication submodules and one second communication submodule, and
   communication between the plurality of first communication submodules and the plurality of second communication submodules.

3. The computer device according to claim 1, wherein the work request is a request of communication between one of the first communication submodules and one of the second communication submodules.

4. The computer device according to claim 1, wherein the processor is further configured to execute the computer executable program, to implement the following operation:
   identifying, based on a mode of communication between different communication submodules in the work request, whether the work request is a work request having no communication dependency.

5. The computer device according to claim 4, wherein the communication mode comprises a mode of data transmission between two communication submodules in the work request, and whether the data transmission between the two communication submodules depends on data sent by another communication submodule.

6. The computer device according to claim 4, wherein the communication mode is determined based on an interface for communication between the different communication submodules.

7. The computer device according to claim 3, wherein the first communication submodule is run by using the computer device, the second communication submodule is run by using another computer device, and the computer device communicates with the another computer device via a network; and
   the host channel adapter is further configured to: directly forward, via the network, the work request identified as having no communication dependency, and forward, via the network and after the queue management, the work request that is not identified as having no communication dependency.

8. The computer device according to claim 1, wherein after the queue management, in forwarding the work request that is not identified as having no communication dependency, the host channel adapter is further configured to:
   load, the work request that is not identified as having no communication dependency into a queue, and determining whether a condition that is recorded in the queue and that triggers the work request that is not identified as having no communication dependency is met; and
   based on the condition being met, sending the work request that is not identified as having no communication dependency.

9. The computer device according to claim 1, wherein the work request comprises a plurality of work requests; and
   the plurality of work requests comprise one or more work requests identified as having no communication dependency, and one or more work requests that are not identified as having no communication dependency.

10. A method for implementing collective communication, wherein the method is applied to a computer device and comprises:
    obtaining an operation request of collective communication;
    converting the operation request of collective communication into a work request, and identifying a work request having no communication dependency;
    directly forwarding the work request identified as having no communication dependency, wherein the work request having no communication dependency is a request of communication between one of first communication submodules and one of second communication submodules which does not need to depend on another communication submodule; and
    forwarding, after queue management, a work request that is not identified as having no communication dependency.

11. The method according to claim 10, wherein the collective communication is any one of the following communication:
    communication between one first communication submodule and a plurality of second communication submodules,
    communication between a plurality of first communication submodules and one second communication submodule, and
    communication between the plurality of first communication submodules and the plurality of second communication submodules.

12. The method according to claim 11, wherein the work request is a request of communication between one of the first communication submodules and one of the second communication submodules.

13. The method according to claim 11, further comprising:
    identifying, based on a mode of communication between different communication submodules in the work request, whether the work request is a work request having no communication dependency.

14. The method according to claim 13, wherein the communication mode comprises a mode of data transmission between two communication submodules in the work request, and whether the data transmission between the two communication submodules depends on data sent by another communication submodule.

15. The method according to claim 13, wherein the communication mode is determined based on an interface for communication between the different communication submodules.

16. The method according to claim 12, wherein the first communication submodule is run by using a first computer device, the second communication submodule is run by using a second computer device, and the first computer device communicates with the second computer device via a network; and the method further comprises: directly forwarding, via the network, the work request identified as having no communication dependency, and forwarding, via the network and after the queue management, the work request that is not identified as having no communication dependency.

17. The method according to claim 11, wherein after the queue management, forwarding the work request that is not identified as having no communication dependency further comprises:

loading the work request that is not identified as having no communication dependency into a queue, and determining whether a condition that is recorded in the queue and that triggers the work request that is not identified as having no communication dependency is met; and based on the condition being met, sending the work request that is not identified as having no communication dependency.

18. The method according to claim 11, wherein the work request comprises a plurality of work requests; and the plurality of work requests comprise one or more work requests identified as having no communication dependency, and one or more work requests that are not identified as having no communication dependency.

* * * * *